US012589340B2

(12) United States Patent
Dagallier et al.

(10) Patent No.: US 12,589,340 B2
(45) Date of Patent: Mar. 31, 2026

(54) ROTARY FILTER AND ASSOCIATED FILTERING METHOD

(71) Applicant: GAUDFRIN, Saint Germain en Laye (FR)

(72) Inventors: Adrien Dagallier, Saint Germain en Laye (FR); Simon Illouz, Saint Germain en Laye (FR); Romain Gallais, Saint Germain en Laye (FR)

(73) Assignee: GAUDFRIN, Saint Germain en Laye (FR)

( * ) Notice: Subject to any disclaimer, the term of this patent is extended or adjusted under 35 U.S.C. 154(b) by 586 days.

(21) Appl. No.: 17/925,817

(22) PCT Filed: May 27, 2020

(86) PCT No.: PCT/FR2020/000177
§ 371 (c)(1),
(2) Date: Nov. 16, 2022

(87) PCT Pub. No.: WO2021/240073
PCT Pub. Date: Dec. 2, 2021

(65) Prior Publication Data
US 2023/0201747 A1 Jun. 29, 2023

(51) Int. Cl.
*B01D 29/41* (2006.01)
*B01D 29/64* (2006.01)
(Continued)

(52) U.S. Cl.
CPC ....... *B01D 29/6438* (2013.01); *B01D 29/413* (2013.01); *B01D 29/94* (2013.01); *B01D 29/96* (2013.01); *B01D 35/12* (2013.01)

(58) Field of Classification Search
CPC .. B01D 29/6438; B01D 29/413; B01D 29/94; B01D 29/96; B01D 35/12; B01D 2201/46; B01D 29/78
(Continued)

(56) References Cited

FOREIGN PATENT DOCUMENTS

| DE | 3814373 A1 | 11/1989 |
| EP | 0629426 A1 | 12/1994 |

(Continued)

OTHER PUBLICATIONS

Foreign Communication from a Related Counterpart Application, International Search Report and Written Opinion with Translation dated Feb. 3, 2021, International Application No. PCT /FR2020/ 000177 filed on May 27, 2020.

*Primary Examiner* — Hayden Brewster
(74) *Attorney, Agent, or Firm* — Conley Rose, P.C.

(57) ABSTRACT
A rotary filter for liquid/solid separation includes a trough for containing a suspension, and at least one disk non-rotatably connected to a main shaft. The at least one disk includes filter sectors that each include a structural element covered by a filter medium, and a duct connecting each filter sector to pipes arranged along the main shaft. The filter sectors include a first series separated from a second series. The main shaft includes first and second pipes that communicate with the first series and the second series, respectively. The rotary filter includes comb teeth arranged above a level of the suspension on either side of the at least one disk. The main shaft occupies a first angular position with the first series under the comb teeth and the second series above the comb teeth, and a second angular position with the second series under the comb teeth and the first series above the comb teeth.

21 Claims, 5 Drawing Sheets

(51) Int. Cl.
    *B01D 29/94*           (2006.01)
    *B01D 29/96*           (2006.01)
    *B01D 35/12*           (2006.01)
(58) Field of Classification Search
    USPC ........................................................ 210/797
    See application file for complete search history.

(56)                    References Cited

FOREIGN PATENT DOCUMENTS

| | | | |
|---|---|---|---|
| FR | 2779973 | A1 | 12/1999 |
| WO | 2021240073 | A1 | 12/2021 |

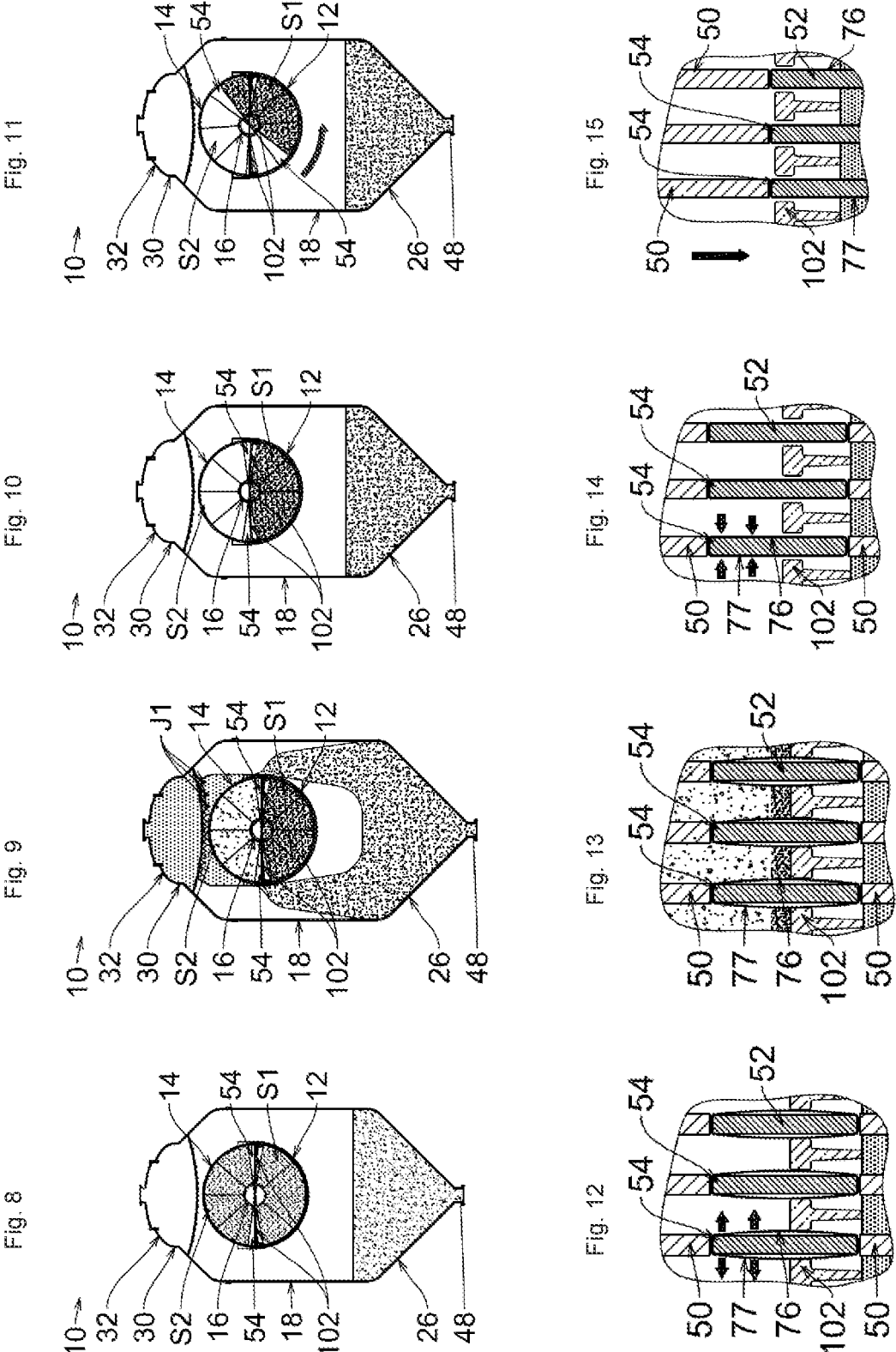

ROTARY FILTER AND ASSOCIATED FILTERING METHOD

CROSS-REFERENCE TO RELATED APPLICATIONS

The present application is a filing under 35 U.S.C. 371 as the National Stage of International Application No. PCT/FR2020/000177, filed May 27, 2020, entitled "ROTARY FILTER AND ASSOCIATED FILTERING METHOD," which is incorporated herein by reference in its entirety for all purposes.

The present invention relates to a rotary filter and to the associated filtration method thereof, in particular of the type used in an industrial facility for liquid/solid separation under vacuum or under pressure. This type of filter is conventionally used for filtering a liquid laden with solid particles, referred to as a suspension, resulting, for example, from treatment of an ore, from crystallization, etc.

In numerous industries, the separation of solid particles from the suspension is carried out by means of filtration, preferably using decantation techniques which require large-volume facilities and excessively long decantation times, or preferably using centrifugation techniques which do not achieve the desired degree of separation and are rendered expensive due to the energy and maintenance required.

The basic principle of filtration consists in pushing the suspension through a filter medium, the porosity of which allows the liquid to pass through but prevents solid particles from doing so. The liquid resulting from the filtration is typically referred to as "filtrate." As the filtrate flows through the filter medium, a layer of solid particles accumulates on the surface of said filter medium. As it grows, this layer of solid particles, typically referred to as a "cake," offers ever greater resistance to the passage of the liquid phase. It may thus sometimes be necessary to remove said cake when it is as thin as possible. The cake is eliminated by means of an operation referred to as cake release. In the case of thin cakes, effective cake release consists in sweeping the cakes by spraying with a fluid. This method of cake release is referred to as "disengagement."

In the case of disk-type rotary filter for example, the filter comprises a tank, referred to as the trough and containing the suspension to be filtered, and a main horizontal shaft equipped with at least two pipes and at least one disk comprising at least two independent filter sectors which are each equipped with a filter medium and which are distributed regularly around the shaft. The interior of each filter sector is in communication with a pipe. The disk is partially immersed in the suspension, in order that the filter sectors soak in said suspension during a portion of their travel during rotation of the shaft.

In the case of a disk-type rotary filter operating under pressure, the disks are placed in a pressurized enclosure, which tends to push the suspension through the filter media, towards the pipes. Filter cakes form on the medium of the filter sectors. When the filter sectors, during their travel, emerge from the suspension, said filter cakes undergo spinning, which then facilitates the cake release thereof.

Currently, in order to carry out said cake release by means of disengagement, it is necessary to empty, in advance, the trough containing the suspension. The disengagement thus leads to idle time which is all the more penalizing for the yield of the filter, the shorter the formation times of the thin cakes.

The aim of the present invention is that of proposing a rotary filter and an associated filtration method which make it possible to work with thin cakes by releasing them by means of disengagement without having to empty the trough containing the suspension, thus ensuring a maximum filtration yield.

This aim is achieved according to the invention by means of a rotary filter for liquid/solid separation of a suspension, comprising a trough containing the suspension, a device for spraying disengagement fluid, and at least one disk which is non-rotatably connected to a main shaft, each disk being partially immersed in the suspension and each disk comprising a plurality of filter sectors, each filter sector comprising a structural element that is covered by a filter medium, and a duct for connection of said sector to a pipe arranged along the main shaft, characterized in that:

each disk comprises a first series of at least one filter sector which is separated from a second series of at least one filter sector by means of two non-filtering zones, the main shaft comprises a first pipe which communicates with the first series of at least one filter sector of each disk, and a second pipe which communicates with the second series of at least one filter sector of each disk, said rotary filter comprises comb teeth which are arranged above the level of the suspension, on either side of each disk, the main shaft is intended to occupy at least:

a first angular position in which the first series of at least one filter sector of each disk is located under the comb teeth, soaking in the suspension to be filtered, and in which the second series of at least one filter sector of each disk is located above the comb teeth, each non-filtering zone being adjacent to one comb tooth on each of the faces thereof, a second angular position in which the second series of at least one filter sector of each disk is located under the comb teeth, soaking in the suspension to be filtered, and in which the first series of at least one filter sector of each disk is located above the comb teeth, each non-filtering zone being adjacent to one comb tooth on each of the faces thereof, so as to allow for the disengagement of the series of at least one filter sector of each disk located above the comb teeth, while the filtration of the suspension continues on the other series of at least one filter sector of each disk located below the comb teeth.

According to other advantageous features of the invention:

the rotary filter comprises at least one seal which is arranged between each non-filtering zone and the adjacent comb tooth, when the main shaft occupies the first angular position and when the main shaft occupies the second angular position;

each seal comprises a retractable part which is controlled between a deployed state in which it establishes sealing contact between the non-filtering zone and the adjacent comb tooth, and a retracted state in which there is no longer sealing contact between the non-filtering zone and the adjacent comb tooth;

each seal comprises at least one resiliently deformable part;

each seal is arranged on the non-filtering zone;

each non-filtering zone comprises a disk sector, referred to as a non-filtering sector, which is interposed between a filter sector of the first series and a filter sector of the second series;

each non-filtering sector comprises at least one inlet pipe for pressurized fluid which is connected to a feed channel which is arranged along the main shaft so as to allow for the deployment of each seal by means of inflation, and the retraction of each seal by deflation;

each seal is a diaphragm which is fixed to a non-filtering sector by the peripheral edges thereof and which comprises a movable main wall which is connected to the peripheral edges by a connecting portion in the form of a gusset;

the comb teeth are fixed to the edges of the trough;

each comb tooth is inclined downwards from the main shaft towards the outside, so as to facilitate the flow, towards the outside of the trough, of sludges formed by the mixture of fluid used during the disengagement of the filter cakes removed from the filter sectors;

the main shaft is equipped with a first downstream valve which makes it possible to close the first pipe when the first series of at least one filter sector of each disk undergoes a disengagement operation, and a second downstream valve which makes it possible to close the second pipe when the second series of at least one filter sector of each disk undergoes a disengagement operation;

the rotary filter comprises a plurality of disks;

the trough is engaged inside a tank which comprises a hopper which is arranged under the trough to recover the sludge originating from the disengagement;

the spraying device for the disengagement comprises an upper chamber provided with at least one feed opening for disengagement fluid, and comprises a series of piercings which are positioned above the disk or disks such that the pressurization of the disengagement fluid in the upper chamber causes disengagement jets towards the main faces of the filter sectors.

The invention also proposes a filtration method for liquid/solid separation of a suspension by means of a rotary filter comprising a trough containing the suspension, a device for spraying disengagement fluid, and at least one disk which is non-rotatably connected to a main shaft, each disk being partially immersed in the suspension and each disk comprising a plurality of filter sectors, each filter sector comprising a structural element that is covered by a filter medium, and a duct for connection thereof to a pipe arranged along the main shaft, the method comprising the following operations:

a) filtration of the suspension on each disk by means of a first or a second series of at least one filter sector, b) disengagement, on each disk, of a first or a second series of at least one filter sector by spraying with a disengagement fluid, the method being characterized in that it comprises a nominal operation cycle during which:

the operation of filtration of the first series of at least one filter sector of each disk is carried out simultaneously with the operation of disengagement of the second series of at least one filter sector of each disk, the main shaft being controlled into a first angular position where the first series of at least one filter sector of each disk soaks in the suspension and where the second series of at least one filter sector of each disk is arranged above the suspension, and the operation of filtration of the second series of at least one filter sector of each disk is carried out simultaneously with the operation of disengagement of the first series of at least one filter sector of each disk, the main shaft being controlled into a second angular position where the second series of at least one filter sector of each disk soaks in the suspension and where the first series of at least one filter sector of each disk is arranged above the suspension.

According to other advantageous features of the method:

the main shaft comprises a first pipe which communicates with the first series of at least one filter sector of each disk, and a second pipe which is separate from the first pipe and communicates with the second series of at least one filter sector of each disk, and during the operation of disengagement of the first series of at least one filter sector of each disk the first pipe is closed, and during the operation of disengagement of the second series of at least one filter sector of each disk the second pipe is closed;

each disengagement operation is preceded by a step of sealing, during which sealing contact is established between each disk and the comb teeth, and each disengagement operation is followed by a step of stopping the sealing, during which the sealing contact is stopped;

the step of sealing consists in controlling the retractable parts of seals into a deployed state where they ensure the sealing contact, and the step of stopping the sealing consists in controlling said retractable parts into a retracted state in which they ensure that said sealing contact is stopped;

the seals are deployed by means of inflation, resulting from the pressurization of a fluid circuit which feeds at least two non-filtering sectors per disk arranged between the two series of at least one filter sector of each disk, through a feed channel arranged along the main shaft, and said seals are retracted by means of deflation, resulting from the drop of pressure of said fluid circuit;

during the nominal cycle, the main shaft is controlled alternately so as to pivot 180 degrees in the clockwise and then the anticlockwise direction between the first angular position and the second angular position;

the sludges originating from the disengagement operations are reinjected, in part, into the feed circuit of the device for spraying the disks during the disengagement operations.

A person skilled in the art could also identify further advantages upon reading the examples below, illustrated by the following accompanying drawings:

FIG. 3 is a longitudinal cross-sectional view according to the plane III-III, showing the deployment of the seals, in this case the inflation of diaphragms with which the non-filtering sectors of the rotary filter of FIG. 1 are equipped;

FIG. 4 is a perspective sectional view showing a portion of the rotary filter of FIG. 1;

FIG. 8 is a schematic view showing a first step of the filtration method according to the invention, where the main shaft of the rotary filter occupies a first angular position, and during which, simultaneously, the filtration starts on a first series of filter sectors of each disk, the spinning of the cakes takes place on a second series of filter sectors of each disk, and the diaphragms are inflated on the non-filtering sectors;

FIG. 9 is a schematic view showing a second step of the filtration method according to the invention, where the main shaft of the rotary filter occupies the same angular position, and during which, simultaneously, the filtration continues on the first series of filter sectors, a disengagement operation takes place on the second series of filter sectors, and the diaphragms are controlled into the inflated state on the non-filtering sectors;

FIG. 10 is a schematic view showing a third step of the filtration method according to the invention, where the main shaft of the rotary filter remains in the same angular position, and during which, simultaneously, the filtration continues on the first series of filter sectors, and the diaphragms are deflated on the non-filtering sectors;

FIG. 11 is a schematic view showing a fourth step of the filtration method according to the invention, during which the main shaft pivots towards a second angular position;

FIG. 12 is a longitudinal cross-sectional view according to the plane III-III showing the sealing by inflation of the diaphragms, during the first step shown by FIG. 8;

FIG. 13 is a longitudinal cross-sectional view according to the plane III-III showing the inflated state of the diaphragms, during the second step shown by FIG. 9;

FIG. 14 is a longitudinal cross-sectional view according to the plane III-III showing the stopping of the sealing by deflation of the diaphragms, during the third step shown by FIG. 10;

FIG. 15 is a longitudinal cross-sectional view according to the plane III-III showing the deflated state of the diaphragms, during the fourth step shown by FIG. 11.

Figure 1:
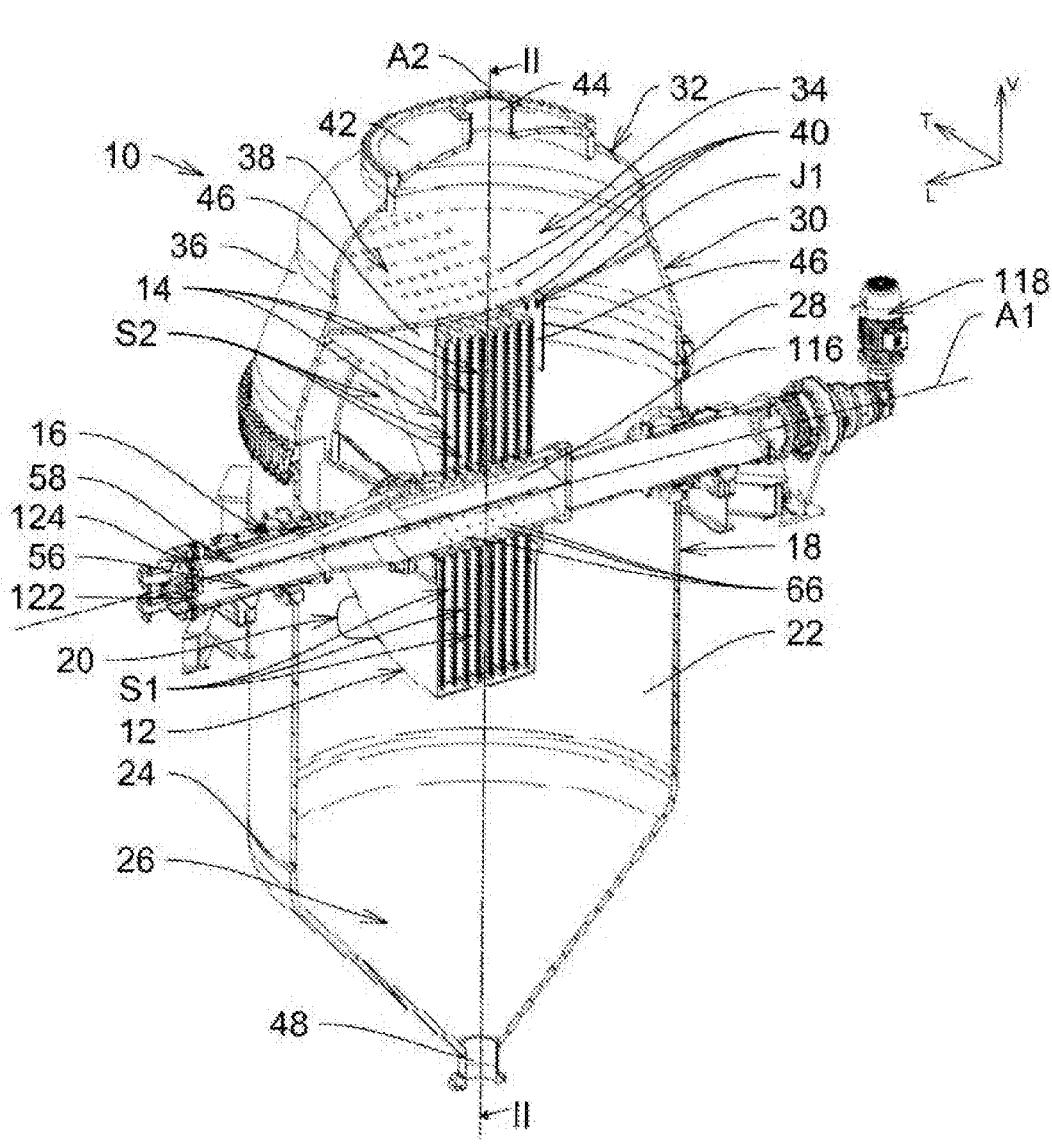
FIG. 1 is a perspective view in longitudinal cross section according to the plane I-I of FIG. 2, showing a rotary filter according to the invention.

FIG. 1 shows a rotary filter 10 intended for equipping an industrial facility for liquid/solid separation of a suspension.

In the remainder of the description, by way of non-limiting example an orientation according to a reference point V, L, T defining the vertical, longitudinal and transverse orientations, shown in FIG. 1, will be used. Furthermore, identical or similar elements may be denoted by the same reference signs.

According to the embodiment shown in FIG. 1, the rotary filter 10 comprises a trough 12 and a plurality of disks 14 which are non-rotatably connected to a main shaft 16. In this case, the main shaft 16 is mounted so as to be rotatable about a longitudinal axis A1 which extends in a longitudinal direction through a tank 18 containing the trough 12 and the disks 14.

Figure 2:
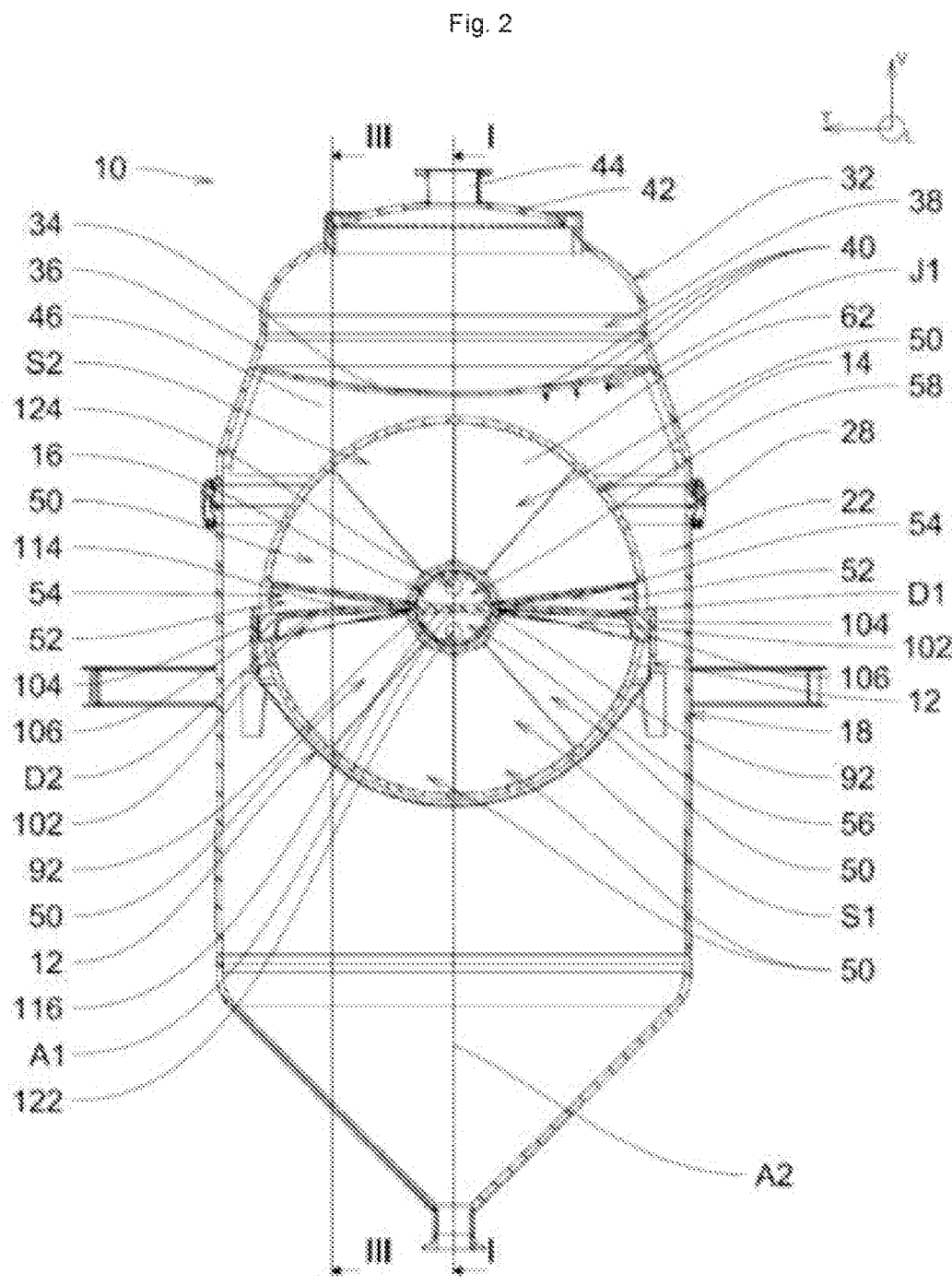
FIG. 2 is a cross-sectional view according to the plane II-II, showing the rotary filter of FIG. 1.
Figures 3, 4:
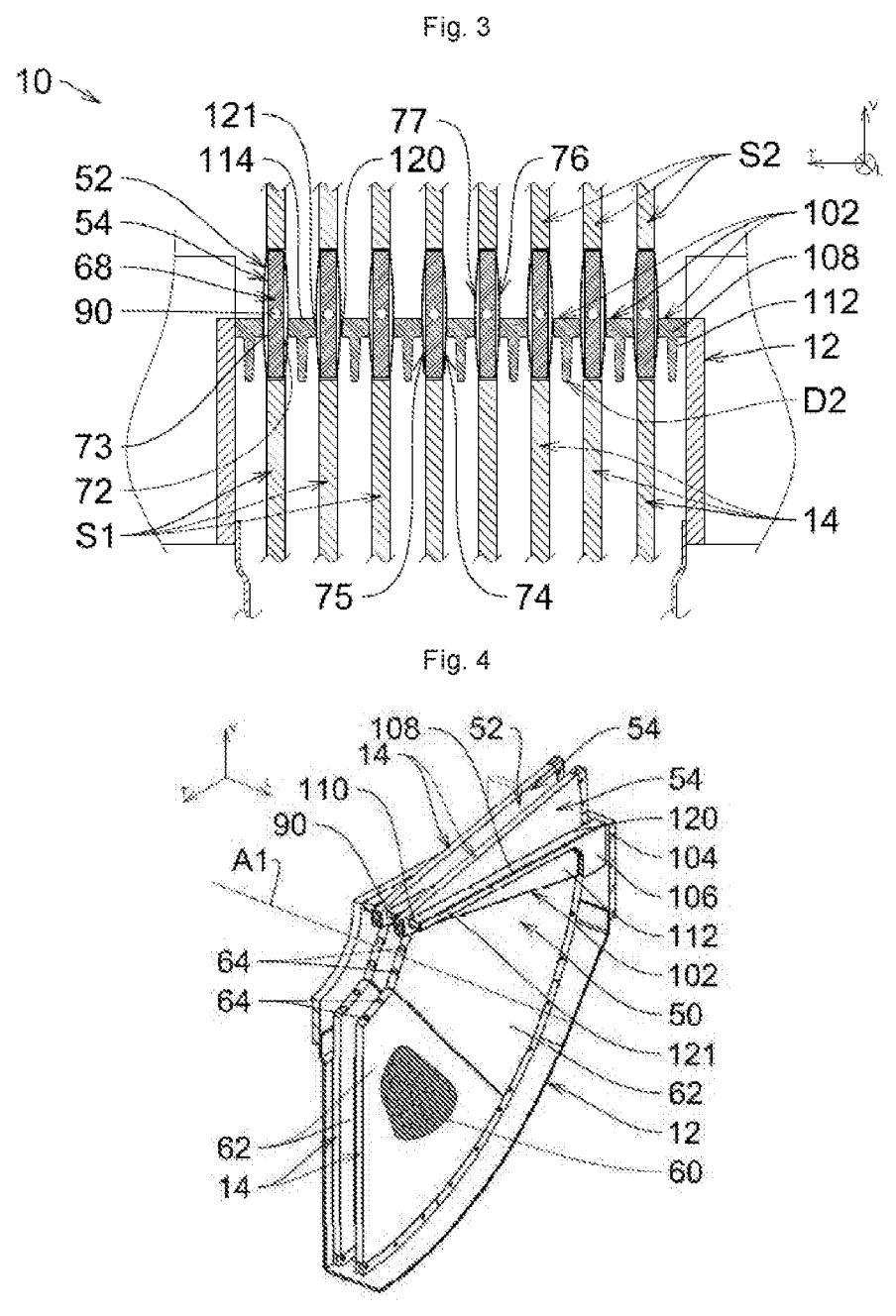

As shown in particular by FIGS. 2 and 3, the trough 12 is generally in the shape of a half-cylinder, open at the top, having a diameter slightly larger than the diameter of the disks 14. The trough 12 is intended to be fed with suspension, in this case by a feed pipe 20.

In this case, the trough 12 is suspended in the center of the tank 18. In this embodiment, the tank 18 comprises a main cylindrical wall 22 having a vertical axis A2, the main cylindrical wall 22 being extended, at the lower axial end 24 thereof, by a hopper 26, and, at the upper axial end 28 thereof, by a cover 30 in the shape of a bell.

According to the embodiment shown, the rotary filter 10 is intended to operate under pressure, i.e. the chamber delimited by the tank 18 is placed under a pressure higher than atmospheric pressure, so as to force the passage of the filtrate through the disks 14, then towards the inside of the main shaft 16, and finally towards the outlet of the main shaft 16, as will be seen in greater detail in the following.

In this case, a spraying device 32 is accommodated in the cover 30 above the disks 14. According to the embodiment shown, the spraying device 32 comprises a spherical cap 34 which in this case is soldered to a frustoconical wall 36 of the cover 30 so as to define, in the top part of the tank 18, an upper chamber 38 which is capable of containing a disengagement fluid. The spherical cap 34 comprises a series of piercings 40 which are positioned above the disks 14 such that the pressurization of the disengagement fluid in the upper chamber 38 causes disengagement jets J1, through the piercings 40, towards the disks 14. The spraying device 32 generally functions in the manner of a shower head.

The cover 30 is advantageously provided with an access hatch 42 which makes it possible to facilitate the cleaning and maintenance of the spraying device 32. In this case, the access hatch 42 is provided with a feed opening 44 for disengagement fluid.

According to another advantageous embodiment, the piercings 40 may be equipped with nozzles which are capable of forming disengagement jets J1, which are flat or of any other shape, oriented towards the main faces, i.e. the radial faces, of the disks 14.

In the remainder of the description, for disk elements or disk sectors, the main face refers to the radial face, i.e. the face which extends in a transverse plane with respect to the axis of the disk.

According to the embodiment shown, flanges 46, in this case in the form of plates in parallel with the disks 14, are fixed on the lower face of the spherical cap 34, on either side of the stack formed by all the disks 14 of the rotary filter 10, so as to define a spraying zone above the disks 14.

It will be noted that the flanges 46 also contribute to reinforcing the rigidity of the spherical cap 34 in the manner of reinforcing ribs.

The hopper 26 is terminated, at the lower axial end thereof, by a bung 48 which allows for the evacuation of the slurries resulting from a disengagement operation.

The disengagement fluid, which can also be referred to as cleaning fluid or cake release fluid or rinsing fluid, is for example a mixture of water and slurries originating from the disengagement operation.

In this case, each disk 14 is formed of a first and of a second series S1, S2 of filter sectors 50, the second series S1, S2 being separated from one another by two non-filtering zones 52 which are diametrically opposed.

In the embodiment shown, each series S1, S2 comprises four filter sectors 50, and each non-filtering zone 52 is a non-filtering sector 54.

It will be noted that the invention also applies to a rotary filter 10 in which a series S1, S2 comprises just one filter sector 50.

The first series S1 of filter sectors 50 is intended to communicate with a first pipe 56 arranged in the main shaft 16, and the second series S2 of filter sectors 50 is intended to communicate with a second pipe 58 arranged in the main shaft 16.

According to the embodiment shown in FIG. 4, each filter sector 50 comprises a structural element 60 which is covered by a filter medium 62, for example a filter cloth, and at least one pipe 64, in this case two, opening into one of the pipes 56, 58 of the main shaft 16 via connection openings 66 visible in FIG. 1.

The structural element 60 serves to support the filter medium 62. The filter medium 62 defines an inner volume of the filter sector 50 in which the filtrate flows.

Advantageously, as shown in FIGS. 3 to 7, each non-filtering sector 54 comprises a solid main body 68, in the shape of a sector of a disk, which in this case is provided with through-holes 70, and which comprises a seal 74, 75 on each of the main faces 72, 73 thereof.

In this case, each seal 74, 75 is a resiliently deformable diaphragm 76, 77. In this case, each diaphragm 76, 77 is fixed to the solid main body 68 by the peripheral edges 78 thereof, by means of mounting flanges 80. Thus, the peripheral edges 78 of each diaphragm 76, 77 are pinched between the mounting flanges 80 and the solid main body 68.

Figures 5, 6, 7:
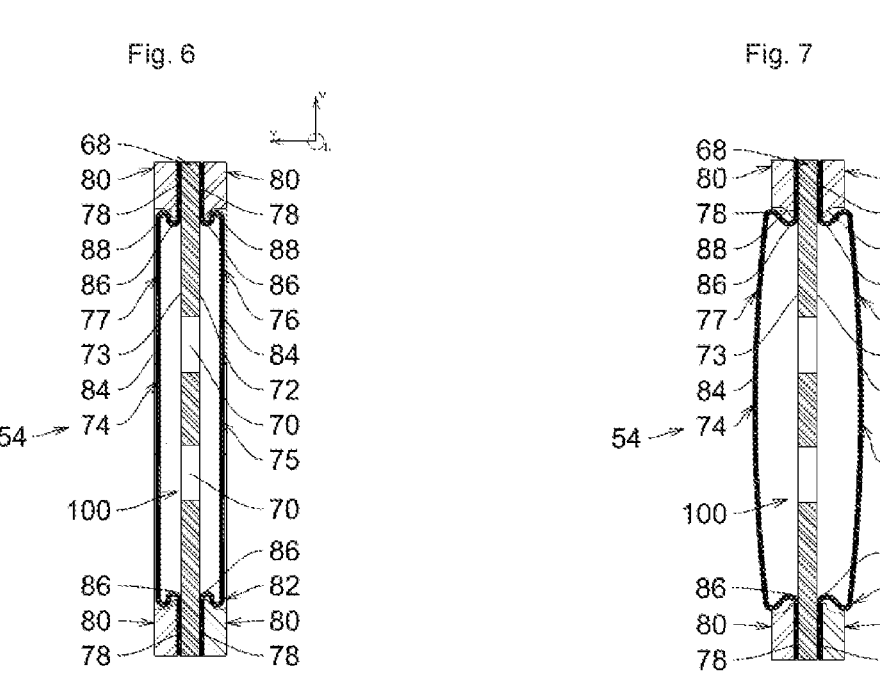
FIG. 5 is a perspective view showing a non-filtering sector of the rotary filter of FIG. 1 equipped with diaphragms.
FIG. 6 is a cross-sectional view according to the plane IV-IV of FIG. 5, showing the non-filtering sector of the rotary filter when the diaphragms are deflated.
FIG. 7 is a cross-sectional view according to the plane IV-IV of FIG. 5, showing the non-filtering sector of the rotary filter when the diaphragms are inflated.

Each diaphragm 76, 77 comprises a retractable part 82 which is made up of a movable main wall 84 and a connecting portion 86 in the form of a gusset which connects the movable main wall 84 to the peripheral edges 78. As can be seen in FIG. 6, in this case the connecting portion 86 has an S-shaped profile. Said connecting portion 86 is intended to be deployed, as shown by FIG. 7, and to thus allow the movement of the movable main wall 84 in a direction opposite to the solid main body 68.

Advantageously, each fixing flange 80 comprises, on the side of the movable main wall 84, a concavely curved edge 88 which is intended to match the S-shape of the connecting portion 86.

In this case, the diaphragms 76, 77 are largely made of a material of the elastomer or rubber type, in order to benefit from sufficient suppleness for the connecting portion 86 to undergo resilient deformation and to thus return naturally to its initial shape following deformation.

The material of each diaphragm 76, 77 can advantageously comprise a core made of textile or another material, which makes it possible to maintain a certain amount of structural tension in the diaphragm 76, 77.

These diaphragms 76, 77 are sealed against the suspension. They have no filtering function. They function as seals, as will be explained in greater detail in the following.

An inlet pipe 90 for pressurized fluid is arranged in the solid main body 68. The inlet pipe 90 communicates, as shown in FIG. 2, with a feed channel 92 for pressurized fluid, for example compressed air, arranged along the main shaft 16, in this case inside, so as to allow for the inflation of each diaphragm 76, 77 by pressurization. The diaphragms 76, 77 thus form retractable seals.

The solid main body 68 is for example formed of steel sheet, or indeed of another material. In this case, it is fixed to the main shaft 16 by means of a base 94 which is provided in particular with two pins 96 and a radial connection tube 98 which communicates on one side with the feed channel 92 for pressurized fluid, and on the other side with the compressed fluid inlet pipe 90.

The pins 96 ensure good positioning of the non-filtering sector 54 on the main shaft 16, preventing the non-filtering sector 54 from pivoting.

Proceeding from the deflated state of the diaphragms 76, 77, shown by FIG. 6, the feed of pressurized fluid via the inlet pipe 90 causes an increase in the pressure inside the non-filtering sector 54 in the cavity 100 delimited by the two diaphragms 76, 77, on either side of the solid main body 68. The increase in the pressure in the cavity 100 tends to push the movable main walls 84 back towards the outside of the non-filtering sector 54, until the movable main walls 84 occupy the inflated state thereof, shown by FIG. 7.

As can be seen in particular in FIGS. 2, 3 and 4, the trough 12 comprises comb teeth 102 which are arranged above the level of the suspension, on either side of each disk 14. In this case, each comb tooth 102 is fixed against a longitudinal edge 104 of the trough 12, for example by screwing, and extends towards the main shaft 16.

In order to ensure good rigidity of the comb teeth 102, each comb tooth 102 comprises a main body which is generally dovetailed in shape, having a support foot 106 for fixing it against the inside face of the longitudinal edge 104 of the trough 12, and a rod 108 which extends from the upper end of the support foot 106 as far as a free end 110 close to the main shaft 16. In this case, each comb tooth 102 comprises a stiffening plate 112 which extends, under the rod 108, as far as the support foot 106.

Advantageously, a first series D1 of comb teeth 102 is arranged on one side of the main shaft 16, and a second series D2 of comb teeth 102 is arranged on the other side of the main shaft 16.

Thus, each disk 14 is clamped by four comb teeth 102, two belonging to the first series D1 and two belonging to the second series D2.

Advantageously, the upper surface 114 of the rod 108 of each comb tooth 102 is inclined downwards from the main shaft 16 which, as will be seen in the following, facilitates the flow of the sludges, originating from the disengagement operation, towards the outside of the trough 12.

As indicated above, the main shaft 16 comprises two inner pipes 56, 58, or chambers, which are separated by a longitudinal separating wall 116. The main shaft 16 is intended to be rotated, by a driving device 118, between two extreme angular positions P1, P2: a first angular position P1, which is shown by FIGS. 1 to 3 and in which the first series S1 of filter sectors 50 soak in the suspension, and a second angular position P2 which is diametrically opposed to the first angular position P1 and in which the second series S2 of filter sectors 50 soak in the suspension.

In the first angular position P1, all the filter sectors 50 of the first series S1 are located in the trough 12, under the comb teeth 102, while all the filter sectors 50 of the second series S2 are located above the trough 12, above the comb teeth 102. The non-filtering sectors 54, which separate the series S1 from the series S2 of filter sectors 50 of each disk 14, are located at the height of the comb teeth 102, such that the inflation of the diaphragms 76, 77 causes sealing contact between the diaphragms 76, 77 and the lateral walls 120, 121 of the adjacent comb teeth 102, in the region of the rods 108.

Advantageously all the disks 14, of which there are eight in this case, are positioned in the same manner as the trough 12, with respect to the main shaft 16. Thus, in the first angular position P1, the first series S1 of filter sectors 50 of all the disks 14 soaks in the suspension, while the second series S2 of filter sectors 50 thereof is positioned above series D1, D2 of comb teeth 102.

The second angular position P2 is symmetrical to the first angular position P1, with respect to the longitudinal axis A1.

Advantageously, the main shaft 16 is equipped with a first downstream valve 122, in this case at the downstream end thereof, which makes it possible to close the first pipe 56 of the filtrate evacuation side, and a second downstream valve 124, in this case at the downstream end thereof, which makes it possible to close the second pipe 58 of the filtrate evacuation side.

The operation of the rotary filter 10 will now be described, in particular with reference to FIGS. 8 to 15 which illustrate different steps of the filtration method. It will be noted that FIGS. 12 to 15 illustrate the shape of the diaphragm 76, 77, respectively, during the steps shown in FIGS. 8 to 11.

The rotary filter 10 is continuously fed with suspension, such as to keep the trough 12 filled.

FIG. 8 shows the rotary filter 10 after it has already undergone a plurality of operating cycles, such that the second series S2 of filter sectors 50, positioned above the series D1, D2 of comb teeth 102, are already covered by cake. Moreover, the hopper 26 is already filled with sludge originating from the preceding disengagement steps.

FIG. 8 shows a first step of the filtration method, during which the suspension is filtered by the first series S1 of filter sectors 50 which are plunged into the suspension. Thus, under the effect of the pressure prevailing in the tank 18, the filtrate passes through the filter medium 62 of the filter sectors 50. The filtrate passes into the first pipe 56 of the main shaft 16, passing through the connection openings 66, and is evacuated from the main shaft 16 by passing through the first downstream valve 122 which is controlled into the open position.

Simultaneously, during said first step, the second downstream valve 124 is controlled into the open position. This maintains a positive difference between the pressure of the tank 18 and the pressure of the second pipe 58 of the main shaft 16, which makes it possible to perform an operation of spinning of the cake on the filter sectors 50 of the second series S2.

Simultaneously, during said first step, the diaphragms 76, 77 are pressurized, as shown by FIG. 12, in order to inflate them so as to establish sealing contact between the comb teeth 102 and the non-filtering sectors 54.

FIG. 9 shows a second step of the method, during which the suspension continues to be filtered by the first series S1 of filter sectors 50, since the main shaft 16 still occupies the first angular position P1 thereof, and since the first downstream valve 122 is still open.

Simultaneously, during said second step, the second downstream valve 124 is controlled into the closed position. This creates an equilibrium between the pressure of the tank 18 and the pressure of the second pipe 58 of the main shaft 16, which makes it possible to perform an effective disengagement operation on the filter sectors 50 of the second series S2 by means of the spraying device 32 which projects disengagement jets J1 onto the filter sectors 50, and more particularly onto the main faces of the filter sectors 50 of the second series S2. The diaphragms 76, 77 are kept in the inflated state on the non-filtering sectors 54 thereof.

As shown in FIG. 9, the disengagement operation produces sludge, i.e. a mixture of disengagement fluid and solid particles originating from the cake. Said sludge flows downwards, along the comb teeth 102, towards the hopper 26.

As shown by FIG. 13, the sealing achieved prior to the inflation of the diaphragms 76, 77 avoids the sludge from penetrating into the trough 12 by passing between the disks 14 and the comb teeth 102. This thus makes it possible to ensure perfect effectiveness, both of the filtration on the first series S1 of filter sectors 50 in the trough 12, and of the disengagement on the second series S2 of filter sectors 50.

FIG. 10 shows a third step of the method, during which the suspension continues to be filtered by the first series S1 of filter sectors 50, since the main shaft 16 still occupies the first angular position P1 thereof, and since the first downstream valve 122 is still open.

Simultaneously, during said third step, the spraying device 32 is stopped since the disengagement operation has ended and the diaphragms 76, 77 are deflated, as shown by FIG. 14. The main shaft 16 still occupies the first angular position P1 thereof, and the second downstream valve 124 is still closed.

The deflation of the diaphragms 76, 77 makes it possible to prevent the diaphragms 76, 77 from rubbing against the adjacent comb teeth 102 when the main shaft 16 is rotated, which would risk causing premature wear.

FIG. 11 shows a fourth step of the method, during which the main shaft 16 is rotated, in this case in the anticlockwise direction, from the first angular position P1 thereof towards the second angular position P2 thereof. In FIG. 11, the main shaft 16 is shown in an intermediate angular position Pi, between the first angular position P1 and the second angular position P2.

During said fourth step, the first downstream valve 122 is kept in the open position, which makes it possible to continue the filtration in the filter sectors 50 of the first series S1, as long as they are soaked in the suspension. As can be seen in FIG. 11, the filter sectors 50 of the first series S1 which emerge from the suspension start their spinning step, while those which are still soaking in the suspension continue to filter.

During said fourth step, the second downstream valve 124 is kept in the closed position, such that the filter sectors 50 of the second series S2, progressively entering the trough 12, do not start to filter.

During the fourth step, the diaphragms 76, 77 remain deflated, as shown by FIG. 15.

At the end of the fourth step, following a 180 degree rotation anticlockwise with respect to the first angular position P1, the main shaft 16 occupies the second angular position P2 thereof, having the filter sectors 50 of the first series S1 in the high position, above the series D1, D2 of comb teeth 102, while the filter sectors 50 of the second series S2 are soaked in the suspension.

Thus, as shown by FIGS. 8 and 12, after the fourth step a new first step begins, but comprising filtration by the second series S2 of filter sectors 50 at the bottom, and comprising spinning by the first series S1 of filter sectors 50 at the top.

A complete nominal operating cycle thus comprises the four steps mentioned above, repeated twice such that the series S1 and the series S2 of filter sectors 50 have passed to the filtration and the disengagement.

Preferably, at the end of the nominal operating cycle, the main shaft 16 is rotated in the reverse direction, in this case in the clockwise direction, so as to return towards the first angular position P1 thereof, from the second angular position P2.

The alternate pivoting in the clockwise and anticlockwise direction in particular makes it possible to not wind the control cables of the downstream valves 122, 124 which are borne by the main shaft 16. This also facilitates the arrangement of the means for feeding pressurized fluid to the feed channels 92 of the main shaft 16.

Advantageously, some of the sludges originating from the disengagement steps are recovered at the outlet of the hopper 26, then reinjected, in part, into the feed circuit of the spraying device 32. It thus forms part of the disengagement fluid. The recirculation thereof makes it possible to reduce the consumption of other fluids for the disengagement, and to minimize the volume of sludges produced, whatever the cake formation time.

The rotary filter 10, and the filtration method according to the invention, is particularly suitable for industrial facilities in which it is desirable to minimize the cake formation time, for example if it is desirable for the cake formation time to be less than 2 minutes.

For example, it is possible to implement the filtration method according to the invention, limiting the first step to 15 seconds, the second step to 90 seconds, the third step to 5 seconds, and the fourth step to 10 seconds.

An advantage of the rotary filter 10 according to the invention is that it facilitates the maintenance operations.

For example, removing the cover 30 makes it possible to have access to the inside of the tank 18, and it is relatively easy to remove the main shaft 16 or the disks 14 in order to replace the filter media 62. Likewise, the access hatch 42 arranged in the cover 30 allows for easy access to the spraying device 32 in order to clean it and in order to unblock the piercings 40 which may clog on account of the recirculation of the sludge.

According to a variant, the spraying device 32 described above may be replaced by a ramp device provided with a plurality of spraying nozzles distributed above the disks 14.

Of course, the invention also applies to a rotary filter 10 operating under vacuum, where the liquid phase of the suspension is suctioned through the filter sectors 50 and through the pipes 56, 58 of the main shaft 16.

According to a variant (not shown), the comb teeth 102 may be mounted on the trough 12 so as to be movable between an active position, as shown in FIGS. 2 to 4, where they are in sealing contact with the non-filtering sectors 54, and a retracted position in which they are no longer in contact with the non-filtering sectors 54. In this case, it is possible to omit the diaphragms 76, 77, and the comb teeth 102 are controlled into the retracted position during the third and the fourth step, in order to allow for rotation of the disks 14.

LIST OF REFERENCE SIGNS

10: rotary filter
12: trough
14: disks
16: main shaft
18: tank
20: feed pipe
22: main cylindrical wall
24: lower axial end
26: hopper
28: upper axial end
30: cover
32: spraying device
34: spherical cap
36: frustoconical wall
38: upper chamber
40: piercings
42: access hatch
44: feed opening
46: flanges
48: bung
50: filter sectors
52: non-filtering zones
54: non-filtering sectors
56: first pipe
58: second pipe
60: structural elements
62: filter media
64: ducts
66: connection openings
68: solid main bodies
70: through-holes
72, 73: main faces
74, 75: seals
76, 77: diaphragms
78: peripheral edges
80: mounting flanges
82: retractable parts
84: movable main walls
86: connecting portions

88: concavely curved edges
90: inlet pipes
92: channels
94: bases
96: pins
98: connection tubes
100: cavities
102: comb teeth
104: longitudinal edges
106: support feet
108: rods
110: free ends
112: stiffening plates
114: upper surfaces
116: separating wall
118: driving device
120, 121: lateral walls
122: first downstream valve
124: second downstream valve
A1: longitudinal axis
A2: vertical axis
D1: first series of comb teeth
D2: second series of comb teeth
J1: disengagement jets
S1: first series of filter sectors
S2: second series of filter sectors

The invention claimed is:

1. A rotary filter for liquid/solid separation of a suspension, comprising a trough configured for containing the suspension, a device configured for spraying disengagement fluid, and at least one disk which is non-rotatably connected to a main shaft, the at least one disk being configured for being partially immersed in the suspension and the at least one disk comprising a plurality of filter sectors, each filter sector of the plurality of filter sectors comprising a structural element covered by a filter medium, and a duct connecting each filter sector to pipes arranged along the main shaft, characterized in that:

the plurality of filter sectors comprises a first series having at least one filter sector which is separated from a second series having at least one filter sector, wherein the first series is separated from the second series by two non-filtering zones, the main shaft comprises a first pipe which communicates with the first series, and a second pipe which communicates with the second series, said rotary filter comprises comb teeth which are configured for being arranged above a level of the suspension, on either side of the at least one disk, the main shaft occupies at least:

a first angular position in which the first series is located under the comb teeth, for soaking in the suspension to be filtered, and in which the second series is located above the comb teeth, each non-filtering zone having faces and being adjacent to one comb tooth on each of the faces thereof, a second angular position in which the second series is located under the comb teeth, for soaking in the suspension to be filtered, and in which the first series is located above the comb teeth, each non-filtering zone having faces and being adjacent to one comb tooth on each of the faces thereof, so as to allow for the disengagement of the first series or the second series located above the comb teeth while continuing filtration of the suspension on the other second series or first series, respectively, located below the comb teeth.

2. The rotary filter according to claim 1, characterized in that it comprises at least one seal which is arranged between each non-filtering zone of the two non-filtering zones and a comb tooth adjacent to the non-filtering zone, when the main shaft occupies the first angular position and when the main shaft occupies the second angular position.

3. The rotary filter according to claim 2, characterized in that each seal of the at least one seal comprises a retractable part which is controlled between a deployed state in which it establishes sealing contact between the non-filtering zone and the comb tooth adjacent to the non-filter zone, and a retracted state in which there is no longer sealing contact between the non-filtering zone and the comb tooth adjacent to the non-filtering zone.

4. The rotary filter according to claim 3, characterized in that each seal comprises at least one resiliently deformable part.

5. The rotary filter according to claim 3, characterized in that each seal is arranged on the non-filtering zone.

6. The rotary filter according to claim 5, characterized in that each non-filtering zone comprises a disk sector, referred to as a non-filtering sector, which is interposed between a filter sector of the first series and a filter sector of the second series.

7. The rotary filter according to claim 6, characterized in that each non-filtering sector comprises at least one inlet pipe for pressurized fluid which is connected to a feed channel which is arranged along the main shaft so as to allow for the deployment of each seal by inflation, and the retraction of each seal by deflation.

8. The rotary filter according to claim 6, characterized in that each seal is a diaphragm which is fixed to a non-filtering sector by peripheral edges thereof and which comprises a movable main wall which is connected to the peripheral edges by a connecting portion in a form of a gusset.

9. The rotary filter according to claim 1, characterized in that the comb teeth are fixed to edges of the trough.

10. The rotary filter according to claim 1, characterized in that each comb tooth is inclined downwards from the main shaft towards an outside, so as to facilitate a flow, towards the outside of the trough, of sludges made up of a mixture of fluid used during the disengagement of filter cakes removed from the plurality of filter sectors.

11. The rotary filter according to claim 1, characterized in that the main shaft is equipped with a first downstream valve which makes it possible to close the first pipe when the first series undergoes a disengagement operation, and a second downstream valve which makes it possible to close the second pipe when the second series undergoes a disengagement operation.

12. The rotary filter according to claim 1, characterized in that it comprises a plurality of disks.

13. The rotary filter according to claim 1, characterized in that the trough is engaged inside a tank which comprises a hopper which is arranged under the trough to recover sludges originating from the disengagement.

14. The rotary filter according to claim 1, characterized in that the spraying device for the disengagement comprises an upper chamber provided with at least one feed opening for disengagement fluid, and comprises a series of piercings which are positioned above the at least one disk such that pressurization of the disengagement fluid in the upper chamber causes disengagement jets towards the main faces of the plurality of filter sectors.

15. A filtration method for liquid/solid separation of the suspension using the rotary filter as recited in claim 1, the method comprising the following operations:
   a) filtering the suspension on the at least one disk using the first series or the second series,
   b) disengaging, on the at least one disk, the first series or the second series by spraying with the disengagement fluid,
   the method being characterized in that it comprises a nominal operation cycle during which:
   carrying out simultaneously the operation of filtration of the first series with the operation of disengagement of the second series, the main shaft being controlled into the first angular position where the first series soaks in the suspension and where the second series is arranged above the suspension, and
   carrying out simultaneously the operation of filtration of the second series with the operation of disengagement of the first series, the main shaft being controlled into the second angular position where the second series soaks in the suspension and where the first series is arranged above the suspension.

16. The filtration method according to claim 15, characterized in that the main shaft comprises a first pipe which communicates with the first series, and a second pipe which is separate from the first pipe and communicates with the second series, and in that, during the operation of disengagement of the first series the first pipe is closed, and during the operation of disengagement of the second series the second pipe is closed.

17. The filtration method according to claim 15, characterized in that each disengagement operation is preceded by: sealing, during which sealing contact is established between the at least one disk and the comb teeth, and in that each disengagement operation is followed by stopping the sealing, during which the sealing contact is stopped.

18. The filtration method according to claim 17, characterized in that the sealing comprises controlling retractable parts of seals into a deployed state where they ensure the sealing contact, and the stopping the sealing comprises controlling said retractable parts into a retracted state in which they ensure that said sealing contact is stopped.

19. The filtration method according to claim 18, characterized in that the seals are deployed by inflation, resulting from pressurization of a fluid circuit which feeds at least two non-filtering sectors per disk arranged between the first series and the second series, through a feed channel arranged along the main shaft, and said seals are retracted by deflation, resulting from a drop of pressure of said fluid circuit.

20. The filtration method according to claim 15, characterized in that, during the nominal cycle, the main shaft is controlled alternately so as to pivot 180 degrees in a clockwise and then an anticlockwise direction between the first angular position and the second angular position.

21. The filtration method according to claim 15, characterized in that sludges originating from the disengagement operations are reinjected, in part, into a feed circuit of the device for spraying the at least one disk during the disengagement operations.

\* \* \* \* \*